Oct. 15, 1929.　　　　M. HARRISON　　　　1,731,743
MACHINE FOR TREATING FOOD ARTICLES
Filed Oct. 31, 1925　　　3 Sheets-Sheet 2

Inventor
Monroe Harrison

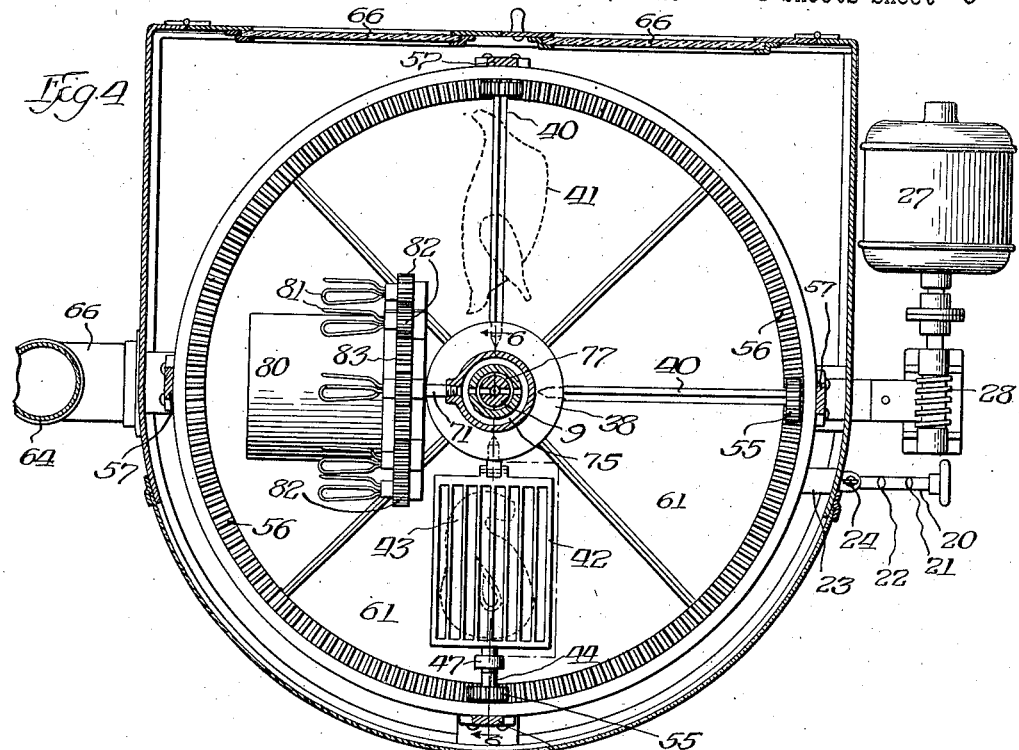
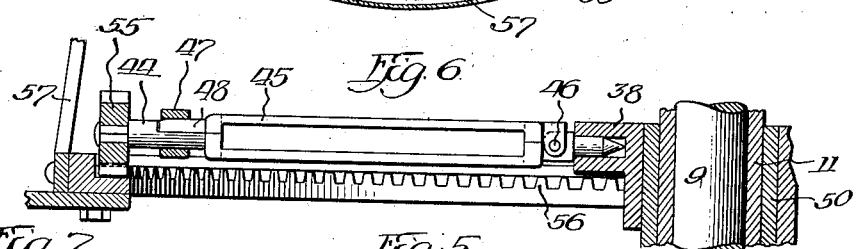
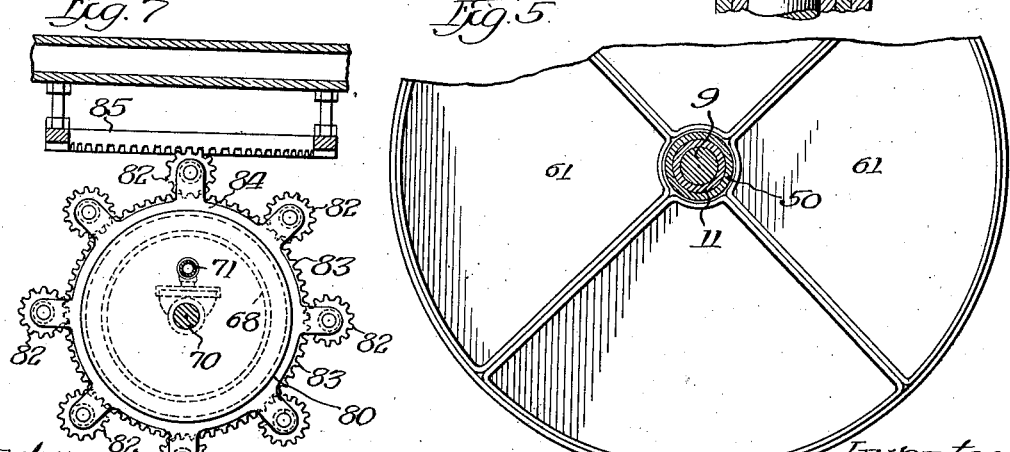

Patented Oct. 15, 1929

1,731,743

UNITED STATES PATENT OFFICE

MONROE HARRISON, OF CHICAGO, ILLINOIS

MACHINE FOR TREATING FOOD ARTICLES

Application filed October 31, 1925. Serial No. 66,122.

My invention relates to machines for treating food articles.

One of the objects of the invention is to provide a simple, practical and inexpensive machine of the class specified.

Another object of the invention is to provide a machine which will be capable of treating some food articles by toasting or the like and treating other articles by roasting, cooking, broiling, or the like.

Another object of the invention is to provide a machine which while capable of treating different food articles in different ways above specified, will be capable of treating such articles independently in the several different ways, or treating the various articles collectively in the ways mentioned.

In the accompanying drawings Fig. 1 is a vertical section of a food treating machine embodying my invention;

Figs. 2, 3, 4 and 5 are cross sections taken on lines 2—2, 3—3, 4—4 and 5—5, respectively in Fig. 1;

Fig. 6 is a cross section taken on line 6—6 in Fig. 4;

Fig. 7 is a cross-section taken on line 7—7 of Fig. 1.

Figure 1:
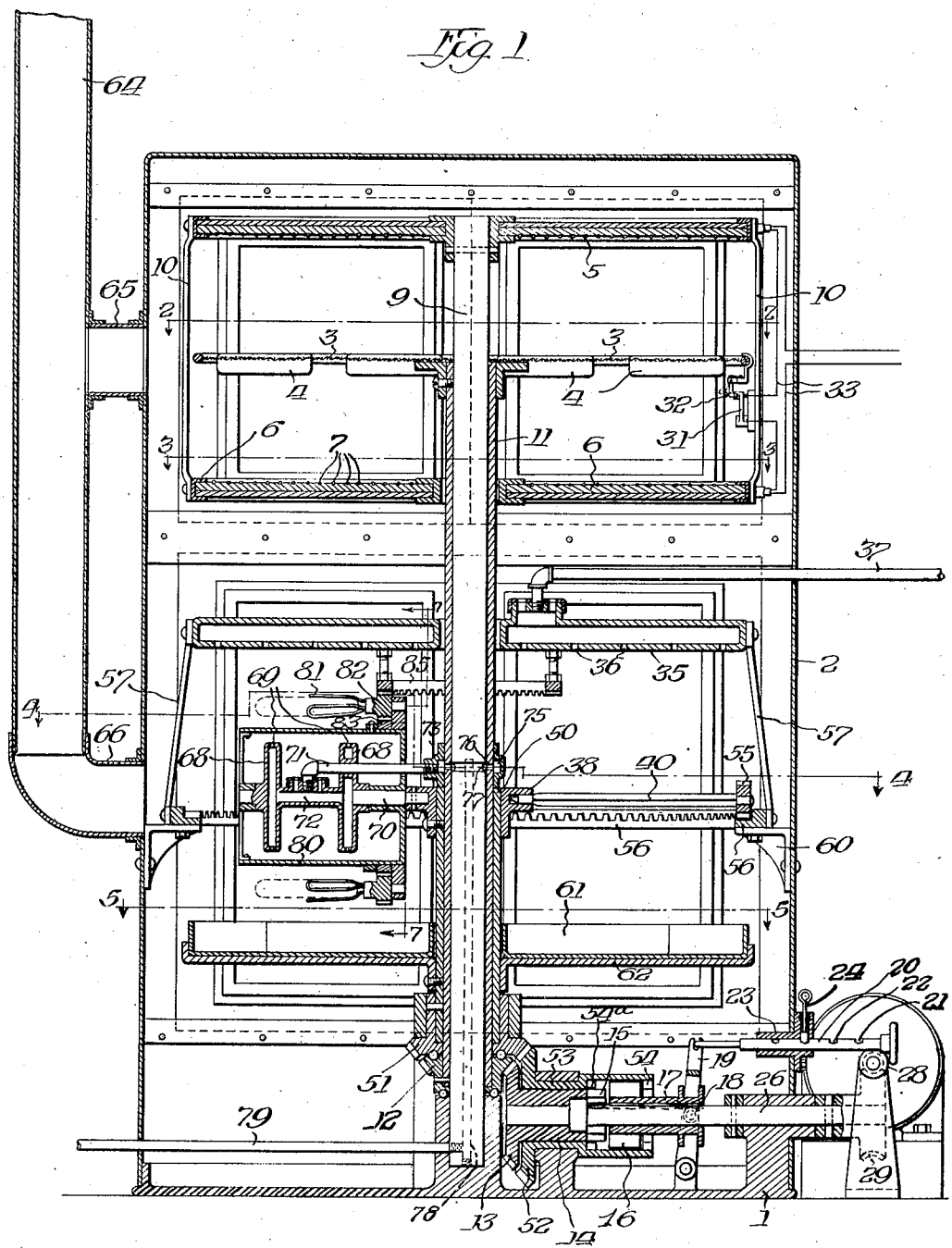
Figure 2:
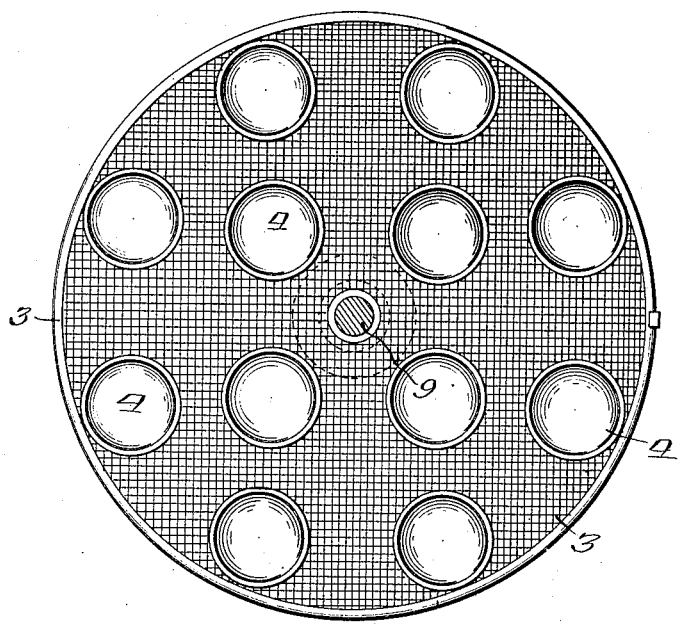

Referring to the drawings, I show a machine preferably having a base 1 and a shell or casing 2, mounted thereon. Within the shell or casing 2 is located the apparatus for treating foods in different ways. At the upper part of the casing I show an arrangement by which foods may be toasted or treated in such manner. The arrangement shown comprises a food holder or carrier 3, preferably in circular or disk form, as shown in Fig. 2, and provided with a series of recesses or pockets or holders 4—4, in which articles to be treated as by toasting may be placed, as for example, sandwiches or the like.

Figure 3:
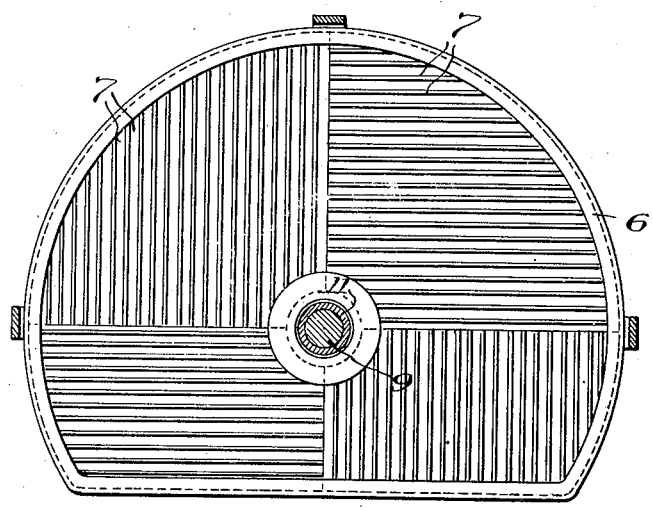

Associated with the food carrier 3 I show one or more heating elements, as for example, the elements 5 and 6, each preferably flat or disk-like in form, but with a cut-away portion or segment as shown in Fig. 3, and each preferably consisting of a plurality of sets or series of coils of insulated wire 7—7, capable of producing heat by an electric current passing through them, these heating elements being preferably the one above and the other below the food holder 3 whereby the food carried by the latter may readily be toasted or similarly treated by these heating elements. The heating elements are cut away as shown in Fig. 3, in order that access may be readily had to the holders of food carrier 3 for the purpose of placing articles of food on said carrier and removing the same therefrom.

As a preferred arrangement there is relative movement such as rotation, between the food carrying element 3 and the heating elements 5 and 6, and this may be advantageously secured by mounting the heating element 5 on the upper end of a post or support 9 mounted and supported by the base 1, and by suspending the lower heating element 6 from the upper element 5 by means of supporting rods or stays 10. The food carrying member 3 may then be moved relatively to heating elements 5 and 6, as by mounting it on a rotary tubular member or sleeve 11 which surrounds the post or support 9 and has its lower end provided with a gear 12 meshing with pinion 13 on sleeve or collar 14. The latter has projections or teeth 15 capable of engagement by a clutch member 16 and sliding sleeve 17 to which is pivoted at 18 a lever 19 engaging a clutch controlling end slide or lever 20, which latter has apertures 21, 22 and 23 with a spring controlled pin 24 for engaging said apertures 21, 22 and 23 to hold said slide 20 in any adjusted position. By moving slide 20 so as to cause member 16 to engage member 15, at which time pin 24 will engage recess 22, rotary shaft 26 will be connected by gears 12 and 13 so as to turn tubular member 11 and thereby cause the rotation of food carrying element 3.

Rotary shaft 26 is driven by a motor 27 and worm and wheel connections 28 and 29.

The operation of the heating elements 5 and 6 may be controlled so as to connect them in circuit for heating purposes, or to disconnect them to prevent their becoming heated, and this may be done by a switch 31 which may be actuated by a lever device 32 on element 3, so that electric circuit 33 for said heating elements 5 and 6 may be opened and closed by element 32 striking and opening switch 31. Element 32 is pivoted so that it may be swung out of operative position, so that if desired, it will not be effective to open the electric circuit for heating elements 5 and 6. By allowing member 3 to rotate with element 32 the heating elements will stay in circuit and in heating condition, but by swinging said element 32 so that it will operate switch 31 said elements may be thrown out of circuit so that they will not perform any heating operation.

Arrangement is also made for treating articles of food by cooking, roasting, broiling and the like. For this purpose I show another treating arrangement or mechanism located in casing 2 below the first mentioned and previously described mechanism. The latter or second mechanism consists of a heating element 35 which may be a gas burner with downwardly projecting orifices 36, and supplied by a gas pipe 37. Below the heating element 35 is a food carrying element or carrier 38 provided with means for holding and carrying articles of food such as chicken, roast beef, steak, and the like, such means comprising a plurality of spindles or pins 40—40, on one of which in Fig. 4 is shown a chicken or duck 41. Also a broiler or grid 42 on which a steak 43 is shown. This grid 42 has also a spindle or pin 44 and a top portion 45 pivoted at 46 so that it may be swung up or down to put the steak or other meat inside and remove it, and also having a collar 47 which may be slipped over the end 48, and so hold the upper member or grid in position. Food carrying member 38 is preferably arranged for movement as rotation relatively to heating element 35. This may be accomplished by mounting member 38 on a tubular member 50 which surrounds tubular member 11, and has its lower end provided with gear 51 meshing with gear 52, whose sleeve or collar 53 is mounted loosely on sleeve or collar 14 of gear 13. Rotation of tubular member 50 may be accomplished by slide end member 20 previously referred to, by pulling said member 20 outwardly so that recess 23 may be engaged by pin 24. This will cause clutch element 16 to engage a cooperating element or cheek 54 by which power will be transmitted from driving shaft 26 through elements 16 and 54, and gears 52 and 51, to said tubular member 50.

Food holding members 40—40 and 42 are preferably arranged for rotation while they are revolved by rotation of member 50. To such end said members 40, 40 and 42 are provided with pinions 44, meshing with an annular rack 56, held stationary, as by supporting members 57—57 which extend downwardly from heating element 35 to said rack 56 and cooperate with side brackets 60 secured to casing 2, and holding said rack 56 properly and firmly in position in casing 2, whereby the rotation of member 50 will cause rotation of members 40, 40 and 42, and thereby turn the articles of food carried by said members so as to expose all parts of the same to the heating element 35.

Arrangement is also preferably made for treating sausages, weenies, or the like. This is preferably in connection with the rotary treating member 38 which to such end may be provided with an apparatus arranged to rotate with said member 38 and comprising a supplemental heating element and means for carrying sausages, weenies or the like, and arranged for treatment of the same by such supplemental heating element. The supplemental heating member or element is shown in the form of two gas heating disks 68—68 having annular gas orifices 69—69 and supported by a pin 70 fitted to the rotary member 38. The gas burners 68—68 may be supplied with gas by pipe 71 communicating with a chamber 72 connecting the burners 68—68. Pipe 71 is connected at its supply end to a sleeve or collar 73 mounted on rotary member 11 and having an annular chamber 75 communicating with orifices 76 in said member 11. Post 9 arranged within sleeve 11 has an annular groove 77 with which communication is made by gas supply pipe 78 in post 9, which pipe 78 in turn is connected with supply pipe 79 whereby gas may be continuously supplied to gas burners 68—68 and this notwithstanding the rotation of member 11 and member 28 carried by member 11.

The burners 68—68 are preferably enclosed within a casing 80 which of course will be heated by burners 68 and so form a heating element of substantially cylindric form as desired in the type of apparatus herein set forth.

The sausages, weenies or the like may be carried by a plurality of forks or holding members 81, and are arranged at intervals around the same. These holders 81 are preferably arranged to be individually rotated so as to expose all parts of each of the sausages or weenies to the heating effects of the heating element 80. To such end in the arrangement shown said holders 81 may be mounted on pinions 82, which latter are in mesh with a ring gear 83 mounted rotatably on shell or casing 80, said pinions 82 themselves being mounted on a stationary ring 84. The uppermost pinion 82 is in mesh with an annular rack 85 so that as this sausage or weenie treating mechanism is rotated by and with member 38, said uppermost pinion 82 will be rotated by rack 85 and will in turn rotate gear 83 which will rotate the other pinions 82—82, whereby the holders 81 carried thereby will be turned or rotated so as to rotate the articles of food carried thereby and thus expose all sides or parts of the same to the influence of heating element 80.

Arrangement is preferably made for catching the drip from the articles on the roasting, cooking, broiling and sausage treating member 38, as for example, drip pans 61—61, mounted on a supporting holder 62 secured to rotary member 50. Thus the drip from the various articles of food will be caught in these pans, each pan catching the drip from one article of or one kind of food, and the pans will be rotated so that the same pan will remain under the several articles by the rotation of member 62 by member 50 with food carrier 38. The pans 61 are preferably removable from the support 62.

A ventilating stack 64 is preferably arranged at one side of casing 2 and provided with flues or ducts 65 and 66 connecting with the food treating chambers containing the food treating mechanisms.

As explained, the upper food treating mechanism involving the food carrying element 3 may be thrown into operation by itself by moving member 20 so that pin 24 will engage recess 22, whereby clutch members 16 and 15 will become engaged and member 11 rotated; also that by moving member 20 to engage pin 24 with recess 23 the lower meat treating mechanism involving the member 38 will be operated by the engagement of clutch members 16 and 54. In order to operate both food treating mechanisms, member 20 may be moved so as to cause pin 24 to engage recess 21, whereby clutch member 16 will engage clutch member 15 and also engage another clutch member 54ª and thereby cause the rotation of both members 11 and 50.

One side of the machine, which may be the back relatively to the operator tending the machine, may be provided with windows 66, to permit the operation of the machine to be seen from the outside, thereby attracting attention to it and serving as an advertising device as well.

Thus it will be seen that articles of food may be toasted or similarly heated or treated by the upper food treating mechanism, and other articles of food may be cooked, broiled, roasted, or similarly treated by the other or lower food treating mechanism. It will also be seen that either one of these mechanisms can be operated by itself or that the two may be operated together.

It will be understood that changes and modifications may be made without departing from the spirit of the invention.

What I claim is:

1. A machine of the class specified comprising a toasting mechanism involving a rotary member and associated heating elements adapted to toast food articles on said rotary member, and a food carrying element and a heating element associated therewith and adapted to roast, broil or similarly treat food articles on said carrying element, the heating and food carrying elements being of circular form and the latter being carried by concentrically arranged rotary members.

2. A machine of the class specified comprising a toasting mechanism involving a rotary member and associated heating elements adapted to toast food articles on said rotary member, and a food carrying element and a heating element associated therewith and adapted to roast, broil or similarly treat food articles on said carrying element, the heating and food carrying elements being of circular form and the latter being carried by concentrically arranged rotary members, and means for rotating said members.

3. A machine of the class specified comprising a toasting mechanism involving a rotary member and associated heating elements adapted to toast food articles on said rotary member, and a food carrying element and a heating element associated therewith and adapted to roast, broil or similarly treat food articles on said carrying element, the heating and food carrying elements being of circular form and the latter being carried on concentrically arranged rotary members, means for rotating said members, and means whereby said rotating means may be connected with either one or both of said members.

4. A machine of the class specified comprising a food treating mechanism involving a rotary food carrying element and heating elements arranged above and below said food carrying element and adapted to toast or similarly treat articles on the latter, and a second food treating mechanism involving a second rotary member and a heating element mounted above the same, said rotating food carrying members being mounted on concentrically arranged rotary supports and means for rotating said supports.

5. A machine of the class specified comprising a food treating mechanism involving a rotary food carrying element and heating elements arranged above and below said food carrying element and adapted to toast or similarly treat articles on the latter, and a second food treating mechanism involving a second rotary member and a heating element mounted above the same, said rotating food carrying members being mounted on concentrically arranged rotary supports, means for rotating said supports, and mechanism whereby either one or both of said supports may be connected for rotation.

6. A machine of the class specified comprising a food treating mechanism involving a rotary food carrying element and heating elements arranged above and below said food carrying element and adapted to toast or similarly treat articles on the latter, and a second food treating mechanism involving a second rotary member and a heating element mounted above the same, said rotating food carrying members being mounted on concentrically arranged rotary supports, means for rotating said supports, and mechanism whereby either one or both of said supports may be connected for rotation, said second mentioned food treating mechanism embodying means for turning the food articles carried by it as they are revolved.

7. A machine of the class specified comprising a rotary food carrying member and heating devices associated therewith adapted to toast articles on said member, a second food treating mechanism comprising a second rotary member and a heating element associated therewith and adapted to broil, roast or similarly treat articles of food on said second member, a central support carrying the heating elements of the first mentioned mechanism, a tubular rotary driving member carrying the food carrying element of the first mentioned mechanism, a second tubular driving member carrying the food carrying element of the second mechanism, gearing for driving said first and second mentioned tubular members, and clutch mechanism connecting either one or both of said tubular driving members for rotation.

8. In a machine of the class specified, a food treating apparatus comprising a movable member carrying a heating element and also carrying food article holders associated with said element, and means whereby the movement of said element will cause the turning of said food article holders so as to expose different parts of the food articles carried thereby to said heating element.

9. In a machine of the class specified, the combination of a rotary member carrying a heating element, and also carrying a plurality of food article holders spaced at intervals around said element, said food article holders being arranged for rotation and means whereby the rotation of said member will cause the rotation of said holders.

10. In a machine of the class specified, the combination of a rotary member carrying a heating element, and also carrying a plurality of food article holders spaced at intervals around said element, said food article holders being arranged for rotation and means whereby the rotation of said member will cause the rotation of said holders, said means comprising an annular rack and pinions carried by said food article holders, one of which meshes with said rack, and an annular ring carried by said heating element and rotatable relatively to the same and meshing with said pinions.

11. In a machine of the class specified, the combination of a rotary member carrying a heating element, and also carrying a plurality of food article holders spaced at intervals around said element, said food article holders being arranged for rotation and means whereby the rotation of said member will cause the rotation of said holders, said means comprising an annular rack and pinions carried by said food article holders, one of which meshes with said rack, and an annular ring carried by said heating element and rotatable relatively to the same and meshing with said pinions, said heating element comprising gas burners and supply pipes for supplying gas thereto during rotation.

12. A machine of the class specified comprising a food treating mechanism comprising upper and lower heating elements and an intermediate food carrying element and another food treating mechanism consisting of a heating element and means for holding food in proximity to said heating element and turning it so as to present all sides of it thereto.

In witness whereof, I hereunto subscribe my name this 19th day of October, A. D., 1925.

MONROE HARRISON.